(12) United States Patent
Liang et al.

(10) Patent No.: US 11,996,548 B2
(45) Date of Patent: May 28, 2024

(54) NEGATIVE ACTIVE MATERIAL, PREPARATION METHOD THEREOF, SECONDARY BATTERY AND RELATED BATTERY MODULE, BATTERY PACK AND DEVICE

(71) Applicant: Contemporary Amperex Technology Co., Limited, Ningde (CN)

(72) Inventors: Chengdu Liang, Ningde (CN); Yuzhen Zhao, Ningde (CN); Yingjie Guan, Ningde (CN); Yan Wen, Ningde (CN); Qisen Huang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 698 days.

(21) Appl. No.: 16/973,152

(22) PCT Filed: Jul. 14, 2020

(86) PCT No.: PCT/CN2020/101816
§ 371 (c)(1),
(2) Date: Dec. 8, 2020

(87) PCT Pub. No.: WO2021/017810
PCT Pub. Date: Feb. 4, 2021

(65) Prior Publication Data
US 2022/0140318 A1    May 5, 2022

(30) Foreign Application Priority Data
Jul. 29, 2019    (CN) .................. 201910687980.X

(51) Int. Cl.
*H01M 4/38*       (2006.01)
*H01M 4/36*       (2006.01)
(Continued)

(52) U.S. Cl.
CPC ........... *H01M 4/366* (2013.01); *H01M 4/483* (2013.01); *H01M 4/62* (2013.01); *H01M 2004/021* (2013.01); *H01M 2004/027* (2013.01)

(58) Field of Classification Search
CPC ........ H01M 4/366; H01M 4/483; H01M 4/62; H01M 2004/021; H01M 2004/027;
(Continued)

(56) References Cited

U.S. PATENT DOCUMENTS

| 2012/0034523 A1 | 2/2012 | Sheem et al. |
| 2014/0127576 A1 | 5/2014 | Kato et al. |
| 2017/0170477 A1 | 6/2017 | Sakshaug et al. |

FOREIGN PATENT DOCUMENTS

| CN | 104022257 A | 9/2014 | |
| CN | 10476321 | * 6/2015 | ........ H01M 10/0525 |

(Continued)

OTHER PUBLICATIONS

Machine translation of CN 104716321, retrieved from <www.espacenet.com> on Nov. 7, 2023.*

(Continued)

*Primary Examiner* — Cynthia K Walls
(74) *Attorney, Agent, or Firm* — East IP P.C.

(57) ABSTRACT

The present application discloses a negative active material, preparation process thereof and a secondary battery and the related battery module, battery pack and device. The negative active material comprises a core structure and a modified polymer coating layer coated on at least a part of the outer surface of the core structure, wherein the core structure comprises one or more of silicon-based materials and tin based materials; and wherein the negative active material has an infrared spectrum comprising an infrared absorption peak at the wavelength of 1450 cm$^{-1}$ to 1690 cm$^{-1}$, and the (Continued)

infrared absorption peak has a transmittance T that satisfies 80%≤T≤99%.

16 Claims, 3 Drawing Sheets

(51) Int. Cl.
  *H01M 4/48* (2010.01)
  *H01M 4/62* (2006.01)
  *H01M 4/02* (2006.01)

(58) Field of Classification Search
  CPC .. H01M 4/0404; H01M 4/043; H01M 4/1395; H01M 4/134; H01M 4/386; H01M 4/387; H01M 4/587; H01M 4/622; H01M 4/625; H01M 10/0525; H01M 4/362; H01M 4/485; H01M 2220/20; Y02E 60/10
  See application file for complete search history.

(56) References Cited

FOREIGN PATENT DOCUMENTS

| CN | 107204438 A | 9/2017 |
|---|---|---|
| CN | 108475779 A | 8/2018 |
| CN | 109216669 A | 1/2019 |
| CN | 109728288 A | 5/2019 |
| CN | 109742369 A | 5/2019 |
| CN | 109786711 A | 5/2019 |
| CN | 110556519 A | 12/2019 |
| JP | 2012501951 A | 1/2012 |
| JP | 201 9511444 A | 4/2019 |
| WO | 2013018486 A1 | 2/2013 |
| WO | 2018145765 A1 | 8/2018 |

OTHER PUBLICATIONS

The First Office Action for Chinese Application No. 201910687980.X, dated Jul. 30, 2021, 8 pages.
The extended European search report for EP Application No. 20819609.7, dated Jul. 28, 2021, 10 pages.
The First Office Action for EP Application No. 20819609.7, dated Mar. 7, 2022, 5 pages.
The Rejection Decision for Chinese Application No. 201910687980.X, dated Jan. 4, 2022, 6 pages.
The Notification of Reexamination for Chinese Application No. 201910687980.X, dated Aug. 16, 2022, 13 pages.
PCT International Search Report for PCT/CN2020/101816, dated Oct. 28, 2020, 12 pages.
The First Office Action for JP Application No. 2022-505353, dated Feb. 14, 2023, 8 pages.
The First Office Action for Korean Application No. 10-2022-7003593 dated Oct. 25, 2023, 15 pages.
Rahaman et al. "A review of heat treatment on polyacrylonitrile fiber", Polymer Degradation and Stability 92 (2007) 1421-1432, dated Apr. 14, 2007, 12 pages.
Lei Luo et al. "Comprehensive Understanding of High Polar Polyacrylonitrile as an Effective Binder for Li-Ion Battery Nano-Si Anodes", ACS Applied Materials and Interfaces 8154-8161, dated Mar. 15, 2016, 8 pages.

* cited by examiner

NEGATIVE ACTIVE MATERIAL, PREPARATION METHOD THEREOF, SECONDARY BATTERY AND RELATED BATTERY MODULE, BATTERY PACK AND DEVICE

CROSS-REFERENCE TO RELATED APPLICATION

This application is a National Stage of International Application No. PCT/CN2020/101816 filed on Jul. 14, 2020 which claims priority to Chinese Patent Application No. 201910687980.X filed on Jul. 29, 2019, both of which are incorporated herein by reference in their entireties.

TECHNICAL FIELD

This application belongs to the technical field of energy storage devices, and specifically relates to a negative active material, preparation method thereof, a secondary battery and related battery module, battery pack and device.

BACKGROUND

In recent years, due to the higher energy density requirements of the electric vehicle industry, a lot of research has been carried out on high-capacity negative active materials. Among them, tin-based materials and silicon-based materials have a higher gram capacity than carbon materials, so they have received much attention. Especially, the silicon-based materials have a very high theoretical gram capacity, which is several times that of graphite materials. However, tin-based materials and silicon-based materials have serious volume effect, which leads to huge volume expansion during the charging process. As a result, the negative electrode active material is easily broken and pulverized during charge and discharge cycles, and is difficult to form a stable SEI film on its surface, which results in the battery's capacity decay too fast and poor cycle performance.

SUMMARY

In a first aspect of the present application, a negative active material is provided, comprising a core structure and a modified polymer coating layer coated on at least a part of the outer surface of the core structure, the core structure comprises one or more of silicon-based materials and tin based materials, the negative active material comprises has an infrared spectrum comprising an infrared absorption peak at the wavelength of 1450 cm$^{-1}$ to 1690 cm$^{-1}$, and the infrared absorption peak has a transmittance T that satisfies 80%≤T≤99%, optionally 85%≤T≤98.5%.

In the negative active material provided by the present application, at least a part of the outer surface of the core material containing silicon-based materials and/or tin-based materials is coated with a modified polymer coating layer and the coated negative active material satisfies specific requirements, can better adapt to the expansion and contraction of silicon-based materials and tin-based materials during charge and discharge cycles, and ensure that a more stable SEI film is formed on the surface of the negative active material, so as to avoid the continuous consumption of a large amount of active ions due to the continuous breakage and repair of SEI film. In addition, it can ensure that the SEI film can always isolate the negative active material from electrolyte and avoid their direct contact during charge and discharge cycles of batteries, reduce the occurrence of side reactions on the negative active material surface, and reduce the damage to the surface structure of the negative electrode active material by electrolyte erosion, so that the first Coulombic efficiency and cycle performance of secondary batteries with the negative active material are greatly improved.

In any of the forgoing embodiments, the coating layer comprises carbon element and comprises —C=C— linkage. The presence of —C=C— linkage enables the coating layer to have strong elasticity and toughness, thereby improving the cycle performance of batteries.

In any of the forgoing embodiments, the carbon element in the coating layer is present in an amount of 0.5%~4.0%, optionally 0.7%~1.3% based on the total weight of the negative active material. The coating layer having above carbon element content may further improve the cycle performance of batteries while making the batteries have a higher energy density.

In any of the forgoing embodiments, the coating layer comprises nitrogen element and comprises —C=N— linkage. The negative active material may further improve the cycle performance of batteries.

In any of the forgoing embodiments, the nitrogen element is present in an amount of 0.1%~0.66%, optionally 0.2%~0.56% based on the total weight of the negative active material. The coating layer containing a specific content of nitrogen element may further improve the cycle performance of secondary batteries.

In any of the forgoing embodiments, the negative active material has an X-ray diffraction pattern comprising a diffraction peak at the diffraction angle 2θ of 19° to 27° and the diffraction peak has a half peak width of 4° to 12°, and optionally 5° to 10°. The negative active material having a diffraction peak at the diffraction angle 2θ of 19° to 27° in which the diffraction peak has a half peak width within above range may further improve the cycle life of batteries.

In any of the forgoing embodiments, the negative active material has a Raman spectrum comprising scattering peaks at the Raman shifts of 1320 cm$^{-1}$~1410 cm$^{-1}$ and 1550 cm$-1$~1650 cm$-1$ in which the scattering peak at the Raman shifts of 1320 cm$^{-1}$~1410 cm$^{-1}$ has a peak intensity recorded as $I_D$, and the scattering peak at the Raman shifts of 1550 cm$^{-1}$ 1650 cm$^{-1}$ has a peak intensity recorded as $I_G$, and the $I_D$ and the $I_G$ stratify 1.60≤$I_D/I_G$≤2.50; optionally, 1.80≤$I_D/I_G$≤2.40. Having the negative active material may increase the first Coulombic efficiency, cycle performance and energy density of secondary batteries.

In any of the forgoing embodiments, the negative active material satisfies one or more of the following items (1) to (5).

(1) The negative active material has a number particle size distribution Dn10 of 0.1 μm~4 μm; optionally, 0.15 μm~3 μm. The number particle size distribution Dn10 of the negative active material within above range may improve the cycle performance and energy density of batteries.

(2) The negative active material has a volume particle size distribution Dv50 of 4 μm~15 μm; optionally, 5 μm~10 μm. The volume particle size distribution Dv50 of the negative active material within above range may further improve the cycle performance of batteries and also is beneficial to improve the energy density of batteries.

(3) The negative active material has a volume particle size distribution Dv99 of 8 μm~25 μm; optionally, 12 μm~22 μm. The volume particle size distribution Dv99 of the negative active material within above range may further improve the cycle performance of batteries.

(4) The negative active material has a compaction density of 1.0 g/cm$^3$~1.6 g/cm$^3$, optionally 1.2 g/cm$^3$~1.5 g/cm$^3$ under the test condition of 5 tons (equivalent to 49 KN). The compaction density of the negative active material within above range is beneficial to improve the cycle performance and energy density of secondary batteries.

(5) The negative active material has a true density of 2.1 g/cm$^3$~2.5 g/cm$^3$, optionally 2.2 g/cm$^3$~2.4 g/cm$^3$. The true density of the negative active material within above range is beneficial to improve the energy density of batteries.

In any of the forgoing embodiments, the silicon-based material is selected from one or more of elemental silicon, silicon-carbon composites, silicon-oxygen compounds, silicon-nitrogen compounds, and silicon alloys, optionally, the silicon-based material is selected from silicon-oxygen compounds; and the tin-based material is selected from one or more of elemental tin, tin oxide compounds, and tin alloys.

In a second aspect of the present application, a preparation process of a negative active material is provided, comprising:
a) providing one or more of silicon-based materials and tin-based materials as a core structure;
b) adding a polymer to a solvent and dispersing it homogenously to obtain a solution;
c) adding the core structure to the solution, and mixing it homogeneously to obtain a mixture slurry;
d) spray drying the mixture slurry under an inert non-oxidizing gas atmosphere to obtain a solid powder;
e) subjecting the solid powder to a heat treatment under an inert non-oxidizing gas atmosphere to obtain the negative active material;
wherein the negative active material comprises a core structure and a modified polymer coating layer coated on at least a part of the outer surface of the core structure, the core structure comprises one or more of silicon-based materials and tin based materials; and the negative active material has an infrared spectrum comprising an infrared absorption peak at the wavelength of 1450 cm$^{-1}$ to 1690 cm$^{-1}$, and the infrared absorption peak has a transmittance T that satisfies 80%≤T≤99%.

In the negative active material obtained by the preparation process of the present application, at least a part of the outer surface of the core structure containing silicon-based materials and/or tin-based materials is coated with a modified polymer coating layer and the coated negative active material satisfies specific requirements, can better adapt to the expansion and contraction of silicon-based materials and tin-based materials during charge and discharge cycles of batteries, and ensure that a more stable SEI film is formed on the surface of the negative active material, so as to avoid the continuous consumption of a large amount of active ions due to the continuous breakage and repair of SEI film. In addition, it can ensure that the SEI film can always isolate the negative active material from the electrolyte and avoid their direct contact during charge and discharge cycles of batteries, reduce the occurrence of side reactions on the negative active material surface, and reduce the damage to the surface structure of the negative electrode active material by electrolyte erosion, so that the first Coulombic efficiency and cycle performance of secondary batteries with the negative active material are greatly improved.

In any of the forgoing embodiments, in the step b), the polymer is selected from one or more of polyethylene, polyvinyl chloride, polyacrylonitrile, polyacrylamide, polyacrylic acid and polyvinylidene chloride; optionally the polymer is selected from one or more of polyacrylonitrile and polyacrylamide. Having the above-mentioned polymer enables the coating layer to have high conductivity while having strong elasticity and toughness, thereby further improving the cycle performance of batteries.

In any of the forgoing embodiments, in the step b), the ratio of mass of the polymer and volume of the solvent is 0.1 g/L~15 g/L, optionally 0.5 g/L~10 g/L. The suitable addition amount of the polymer is beneficial to improve the particle size distribution of the negative active material, and to make the $D_n10$, $D_v50$ and $D_v99$ of the negative active material within an appropriate range, thereby improving the energy density and cycle performance of batteries.

In any of the forgoing embodiments, in the step c), the ratio of mass of the core structure and mass of the polymer is 10~180, optionally 16~100. The mass ratio of the core structure and the polymer is within a suitable range, which enables batteries to have high energy density and cycle performance.

In any of the forgoing embodiments, in the step d), the spray drying is carried out at a temperature of 80° C.~300° C., optionally 110° C.~250° C. The temperature for the spray-drying step within an appropriate range is beneficial to make the coating of the negative active material more uniform, and is beneficial to improve the particle size distribution of the negative active material, thereby improving the energy density and cycle performance of batteries.

In any of the forgoing embodiments, in the step e), the heat treatment is carried out at a temperature of 250° C.~450° C., optionally 300° C.~450° C., which is beneficial to optimize the composition of coating layer and make the negative active material satisfy the requirements prescribed herein for the transmittance T of the infrared absorption peak at the wavelength of 1450 cm$^{-1}$ to 1690 cm$^{-1}$, thereby further improving the cycle performance of batteries.

Optionally, in the step e) the heat treatment is carried out for 2 h~8 h, optionally 3 h~5 h.

In a third aspect of the present application, a secondary battery is provided, which comprises the negative active material according to the first aspect of the present application or the negative active material obtained by the preparation process according to the second aspect of the present application.

The secondary battery of the present application have high first Coulombic efficiency and cycle performance both since it adopts the negative active material of the present application.

In a fourth aspect of the present application, a battery module is provided, which comprises the secondary battery according to the third aspect of the present application.

In a fifth aspect of the present application, a battery pack is provided, which comprising the battery module according to the fourth aspect of the present application.

In a sixth aspect of the present application, a device is provided, which comprises at least one of the secondary battery according to the third aspect of the present application, the battery module according to the fourth aspect of the present application, or the battery pack according to the fifth aspect of the present application.

The battery module, battery pack and device of the present application comprise the secondary battery, thus having at least the same or similar technical effect as the secondary battery.

DETAILED DESCRIPTION

Figure 1:
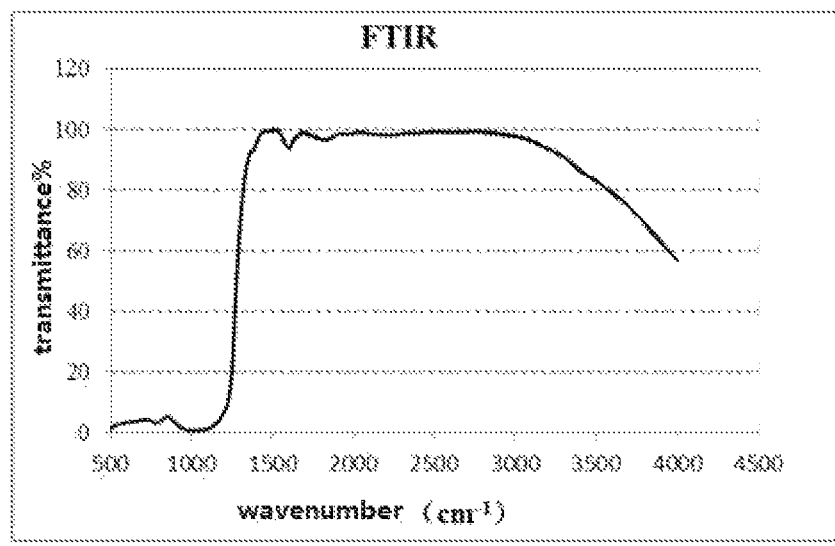
FIG. 1 is an infrared spectrum of a negative active material according to the present application.

In order to make the object, technical solution, and technical effects of the present application apparent, the following further describes the present application in detail with reference to the embodiments. It should be understood that the embodiments described in the present description are only for explaining the present application, and are not intended to limit the application.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

In the description herein, it should be noted that, unless otherwise stated, the recitation of numerical ranges by "above" and "below" include all numbers within that range including the endpoints. As used herein, "a", "an", "the", "at least one", and "one or more" are used interchangeably, unless indicated otherwise and the recitation of "more" in the phrase "one or more" includes two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

When a battery is first charged, an SEI (solid electrolyte interphase) film will be formed on the surface of its negative electrode active material. However, since silicon-based materials and tin-based materials have a large volume effect, the SEI film on the surface of the negative active material containing silicon-based materials and/or tin-based materials will continue to be broken and repaired during charge and discharge cycles of batteries, which will consume a large amount of active ions, thereby reducing the Coulombic efficiency of the battery and increasing the irreversible loss of active ions. In addition, having the SEI film on the surface of the negative active material been broken, the exposed negative active material directly contacts electrolyte, and increases the side reactions on the surface of the negative active material; and under the electrolyte erosion, the surface structure of the negative active material is easily destroyed, which accelerates the degradation of battery capacity.

The inventors of the present application have discovered that it is possible to effectively improve stability of the SEI film on the surface of the negative active material and effectively protect the core structure so as to effectively reduce the damage to the surface structure of the negative electrode active material during charge and discharge cycles of batteries, reduce the loss of active ions, and reduce the capacity loss of batteries by adopting silicon-based materials and/or tin-based materials as a core structure and coating at least a part of the outer surface of the core structure with a coating layer with specific infrared light absorption capability.

Next, the negative active material and the secondary battery of the embodiments of the present application will be described in detail.

Negative Active Material

In a first aspect of the present application, a negative active material is provided. The negative active material comprises a core structure and a modified polymer coating layer coated on at least a part of the outer surface of the core structure, the core structure comprises one or more of silicon-based materials and tin based materials, the negative active material comprises has an infrared spectrum comprising an infrared absorption peak at the wavelength of 1450 $cm^{-1}$ to 1690 $cm^{-1}$, and the infrared absorption peak has a transmittance T that satisfies 80%≤T≤99%.

In the negative active material of the present application, silicon-based materials and tin based materials are used as a core structure, which is beneficial to make the negative active material have a higher gram capacity, thereby obtaining secondary batteries having a higher energy density.

At the same time, at least a part of the outer surface of the core structure is coated with a modified polymer coating layer, and the negative electrode active material has an infrared absorption peak at the wavelength of 1450 $cm^{-1}$~1690 $cm^{-1}$ and the transmittance T of the infrared absorption peak is 80%~99% in its infrared spectrum analysis, as shown in FIG. 1.

In an infrared spectrum, transmittance of infrared absorption peaks can be used to characterize the ability of functional groups to absorb infrared light. The transmittance of infrared absorption peaks is related to the content of functional groups and the higher the content of functional groups, the lower the transmittance of the absorption peak that characterizes the functional group is. In the negative active material of the present application, the infrared light absorption peak at the wavelength of 1450 $cm^{-1}$~1690 $cm^{-1}$ originates from the —C═C— linkage in the coating layer. The presence of —C═C— linkage enables the coating layer to have strong elasticity and toughness. Compared with the conventional inorganic carbon layer, the coating layer of the present application can better adapt to the expansion and contraction of the core structure comprising silicon-based materials and/or tin-based materials during charge and discharge cycles of batteries, and ensure that a more stable SEI film is formed on the surface of the negative active material, so as to avoid the continuous consumption of a large amount of active ions due to the continuous breakage and repair of SEI film. In addition, the polymer coating layer and the stable SEI film can always isolate the core structure from electrolyte and avoid their direct contact during charge and discharge cycles of batteries, reduce the occurrence of side reactions on the negative active material surface, and protect the surface of the core structure from electrolyte erosion and reduce the damage to the surface structure of the core structure, thereby reducing the capacity loss of batteries. Thus, the cycle performance of batteries is greatly improved.

In particular, the inventors discovered that when the infrared absorption peak transmittance of the negative electrode active material of the present application at the wavelength of 1450 cm$^{-1}$~1690 cm$^{-1}$ is within the given range, the negative electrode active material can simultaneously have higher first Coulombic efficiency and better cycle performance.

Therefore, the negative electrode active material of the present application can well improve the first Coulombic efficiency of secondary batteries and improve the cycle performance of the batteries.

In the negative electrode active material of the present application, the transmittance T of the infrared absorption peak at the wavelength of 1450 cm$^{-1}$~1690 cm$^{-1}$ may be ≤99%, ≤98.5%, ≤98%, ≤97%, ≤96%, ≤95%, ≤94%, ≤93%, ≤92%, or ≤90%. In the negative electrode active material of the present application, the transmittance T of the infrared absorption peak at the wavelength of 1450 cm$^{-1}$~1690 cm$^{-1}$ may be ≥80%, ≥81%, ≥82%, ≥83%, ≥84%, ≥85%, ≥86%, ≥87%, ≥88%, or ≥89%. For example, 85%≤T≤98.5%.

When the transmittance T of the infrared absorption peak at the wavenumber of 1450 cm$^{-1}$~1690 cm$^{-1}$ of the negative electrode active material is less than 80%, the capacity loss of the negative active material is relatively large, and the negative active material may agglomerate during the production process, thereby affecting the first Coulombic efficiency and cycle performance of batteries. When the transmittance T of the infrared absorption peak at the wavenumber of 1450 cm$^{-1}$~1690 cm$^{-1}$ of the negative electrode active material is >99%, it is difficult to coat uniformly with the coating layer, and the coating layer has poor elasticity and toughness so that it cannot either effectively stabilize the SEI film structure or isolate the core structure from damage by electrolyte and will also cause the Coulombic efficiency and cycle performance of batteries to decrease.

In the negative active material of the present application, optionally, the carbon element in the coating layer is present in an amount of 0.5%~4.0% based on the total weight of the negative active material. Optionally, the carbon element in the coating layer is present in an amount of 0.7%~1.3% based on the total weight of the negative active material. The coating layer having above carbon element content may further increase the stability of SEI film on the surface of the negative active material and effectively protect the core structure while making the batteries have a higher energy density.

In some embodiments, optionally, the coating layer further comprises nitrogen element and comprises —C=N— linkage. When the coating layer comprises —C=N-linkage, it will have high conductivity, which is capable of improving the electronic conductivity of the negative active material, thereby further improving the actual capacity and capacity retention rate during the cycle of the negative active material and also inhibiting the impedance increase of secondary batteries during charge discharge cycle and reducing polarization of batteries. Therefore, the cycle performance of batteries is further improved.

Optionally, the nitrogen element is present in a mass percentage of 0.1%~0.66% based on the total weight of the negative active material. The coating layer containing a specific content of nitrogen element may further improve the conductivity and toughness of the coating layer, thereby further improving the cycle performance of secondary batteries.

Further optionally, the mass percentage of the nitrogen element is 0.2% to 0.56% based on the total mass of the negative electrode active material.

In the negative active material of the present application, the coating layer may be obtained by heat treatment of a polymer. Optionally, the polymer may be selected from one or more of polyethylene, polyvinyl chloride, polyacrylonitrile, polyacrylamide, polyacrylic acid, and polyvinylidene chloride. For example, the polymer is selected from one or more of polyacrylonitrile and polyacrylamide.

Specifically, the coating layer is obtained by heat treatment of a polymer at 250° C. to 450° C., for example, at 300° C. to 450° C., which is beneficial to make the transmittance T of the infrared absorption peak at the wavelength of 1450 cm$^{-1}$~1690 cm$^{-1}$ of the negative active material meet the aforementioned requirements.

In addition, in the modified polymer coating layer obtained by heat treatment of the nitrogen-containing polymer at 250° C.~450° C., the nitrogen content can meet the aforementioned requirements. In particular, the coating layer comprises a carbon-nitrogen —C=N— double bond formed by nitrogen atoms and carbon atoms, which further improves the conductivity of the coating layer. Therefore, the conductivity and mechanical toughness of the negative active material are improved, thereby improving the cycle performance of batteries.

In the negative active material of the present application, optionally, the coating layer is coated on 80% or more of the surface of the core structure. If the coating layer is coated on the entire surface of the core structure, it can more fully protect the core structure, thereby more sufficiently protecting the core structure.

In the negative active material of the present application, optionally, the silicon-based material may be selected from one or more of elemental silicon, silicon-carbon composites, silicon-oxygen compounds, silicon-nitrogen compounds, and silicon alloys. Further optionally, the silicon-based material is selected from silicon-oxygen compounds.

The silicon-oxygen compound has a chemical formula of $SiO_x$, in which 0<x<2. The silicon-oxygen compound has a higher theoretical gram capacity, which is about 7 times that of graphite; and compared with elemental silicon, the silicon-oxygen compound has greatly reduced volume expansion effect. Therefore, the use of silicon-oxygen compounds can improve the energy density and cycle performance of secondary batteries.

Optionally, in the chemical formula SiOx of the silicon-oxygen compound, 0.6≤x≤1.5; for example, 0.9≤x≤1.2. The value of x in the silicon-oxygen compound SiOx is within the above range, which is beneficial to make the negative electrode material containing the silicon-oxygen compound have both a higher gram capacity and a longer cycle life.

The silicon alloy may comprise, for example, one or more of Li—Si alloy, Si—Mg alloy, Si—Ni alloy, Si—Cu alloy, Si—Fe alloy, Si—Ti alloy, and Si—Al alloy.

In the negative active material of the present application, optionally, the tin-based material may be selected from one or more of elemental tin, tin oxide compound, and tin alloy. As an example, the tin oxide compound can comprise one or more of $SnO_y$ (0<y≤2) and $SnM_uO_v$ in which M can be one or more of B, P and Al, u≥1, v>2. For example, the tin oxide compound may comprise SnO, $SnO_2$, and mixtures thereof.

As an example, the tin alloy may comprise one or more of Li—Sn alloy, Li—Sn—O alloy, Sn—Sb alloy, Sn—Cu alloy, Sn—Ni alloy, Sn—Mg alloy, Sn—Ca alloy, Sn—Co alloy, and Sn—Mn alloy.

Figure 2:
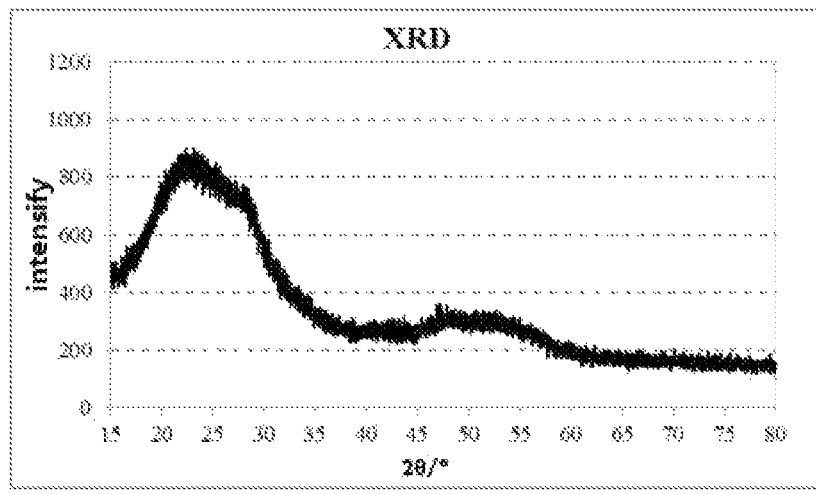
FIG. 2 is an X-ray diffraction (XRD) diagram of a negative active material according to the present application.

In some alternative embodiments, as shown in FIG. 2, the negative active material of the present application has a diffraction peak at a diffraction angle 2θ of 19°~27°, and the diffraction peak has a full width at half maxima of 4°~12°, for example, 5°~10° in its X-ray diffraction analysis. Full width at half maxima (FWHM), also known as FWHM, refers to the width of the peak at half of the peak height.

The negative active material with a diffraction peak at 2θ of 19°~27° in which the diffraction peak has a full width at half maxima within the above range has a higher gram capacity and a lower cycle expansion effect, which is not prone to cracking and pulverization during charge and discharge cycles of secondary batteries, so the cycle life of batteries can be further improved.

Figure 3:
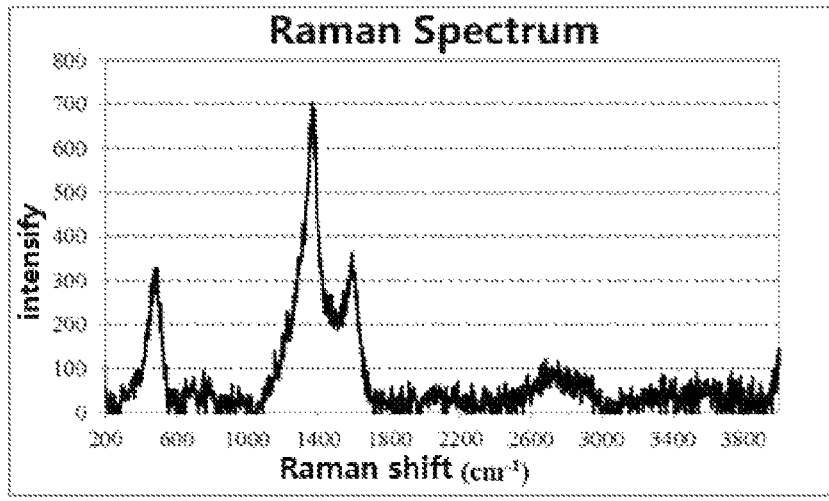
FIG. 3 is a Raman spectrum of a negative active material according to the present application.

In some embodiments, in Raman scattering analysis, the negative active material has scattering peaks at the Raman shifts of 1320 $cm^{-1}$~1410 $cm^{-1}$ and 1550 $cm^{-1}$~1650 $cm^{-1}$, as shown in FIG. 3. That is, in the Raman spectrum of the negative active material, there is a carbon D-band scattering peak (referred to as peak D) at the Raman shift of 1320 $cm^{-1}$~1410 $cm^{-1}$, and a carbon G-band scattering peak (referred to as peak G) at the Raman shift of 1550 $cm^{-1}$~1650 $cm^{-1}$. The ratio of peak intensity $I_D$ of peak D to peak intensity $I_G$ of peak G may satisfy 1.60≤ID/IG≤2.50. Optional, 1.80≤ID/IG≤2.40.

The ratio of peak intensity $I_D$ of peak D to peak intensity $I_G$ of peak G within the above range can reduce the irreversible capacity of the material in charge discharge cycle, and ensure that the coating layer has excellent conductivity, which is conducive to the actual capacity of the material and improve the cycle capacity retention rate, thereby improving the first coulomb efficiency, cycle performance and energy density of secondary batteries with the negative active materials.

In some embodiments, the negative active material may have a number particle size distribution $D_n10$ of 0.1 μm to 4 μm. Optionally, the $D_n10$ of the negative active material is 0.15 μm to 3 μm. The negative active material can reduce the side reactions of the negative electrode film, reduce the consumption of electrolyte, and is also beneficial to increase the compaction density of the negative electrode membrane, thereby improving the cycle performance and energy density of batteries.

In some embodiments, the negative active material may have a volume particle size distribution $D_v50$ of 4 μm to 15 μm. Optionally, the $D_v50$ of the negative electrode active material is 5 μm-10 μm.

The $D_v50$ of the negative electrode active material may be 4 μm or more, and further may be 5 μm or more, which can reduce the film-forming consumption of active ions on the negative electrode, and reduce the side reaction of electrolyte on the negative electrode, thereby reducing the irreversible capacity of batteries and improving the cycle performance of batteries. In addition, the Dv50 of the negative electrode active material is optionally 4 μm or more, and further optionally it is 5 μm or more, which is also conducive to reducing the amount of binder added in the negative electrode, and thus is conducive to improving the energy density of batteries.

Optionally, the $D_v50$ of the negative electrode active material is 15 μm or less, and further optionally it is 10 μm or less, which is beneficial to improve the conductivity of active ions and electrons, and also helps prevent particles from cracking or pulverizing during charging and discharging cycles, thereby further improving the cycle performance of batteries.

In some embodiments, the negative active material may have a volume particle size distribution $D_v99$ of 8 μm-25 μm. Optionally, the $D_v99$ of the negative electrode active material is 12 μm-22 μm. The $D_v99$ of the negative electrode active material within the above range can further increase the diffusion rate of active ions and electrons in the negative electrode film, while reducing the particle breakage phenomenon caused by excessive internal stress when the particle volume changes, and reducing the expansion rate of the electrode plate, thereby improving the cycle performance of batteries.

In some embodiments, the negative active material has a true density of 2.1 $g/cm^3$~2.5 $g/cm^3$. Optionally, the true density of the negative electrode active material is 2.2 $g/cm^3$ to 2.4 $g/cm^3$. The true density refers to the ratio of the mass of the negative active material in g to its true volume in $cm^3$, where the true volume is the actual volume of the solid material, excluding pores inside the particles.

The true density of the negative electrode active material is within the above range, which is beneficial to make the negative electrode film layer have a higher compaction density and improve the energy density of batteries.

In some embodiments, the negative active material has a compaction density of 1.0 $g/cm^3$ to 1.6 $g/cm^3$ measured under a pressure of 5 tons (equivalent to 49 KN). Optionally, the negative active material has a compaction density of 1.2 $g/cm^3$ to 1.5 $g/cm^3$ measured under a pressure of 5 tons. The compaction density of the negative electrode active material is within the given range, which is beneficial to improve the cycle performance and energy density of secondary batteries.

In the present application, the negative active material can be analyzed by infrared spectroscopy using instruments and methods known in the art, such as an infrared spectrometer. As an example, the infrared spectrum of the negative active material of the present application can be tested using the IS10 Fourier Transform Infrared Spectrometer from Nicolet, USA in accordance with GB/T6040-2002 General rules for infrared spectrum analysis.

In the present application, the X-ray diffraction spectrum of the negative active material can be measured by instruments and methods well known in the art. For example, an X-ray diffractometer is used to measure the X-ray diffraction spectrum in accordance with JIS K0131-1996 (General rules for X-ray diffractometric analysis). As an example, Type Bruker D8 Discover X-ray diffractometer may be used, in which $CuK_\alpha$ rays is used as the radiation source, the ray wavelength is λ=1.5406 Å, the scanning 2θ angle range is 15°~80°, and the scanning rate is 4°/min.

In present application, the Raman spectrum of the negative active material can be measured by instruments and methods known in the art. For example, a Raman spectrometer is used. As a specific example, LabRAM HR Evolution laser microscopic Raman spectrometer is used to perform Raman scattering analysis on the negative active material in which a solid-state laser with a wavelength of 523 nm is used as the light source, the beam diameter is 1.2 μm, and the power is 1 mW; macro Raman test mode is used and CCD detector is used. The negative active material powder is pressed into a tablet, on which 3 points are randomly chosen for testing, and average three sets of measured values obtained.

In the present application, the particle size distribution Dn10, Dv50 and Dv99 of the negative active material have the meanings known in the art, and can be measured with instruments and methods known in the art. For example, they may be measured with a laser particle size analyzer, such as Mastersizer 3000 laser particle size analyzer from Malvern Instruments Co., Ltd., UK in accordance with GB/T 19077-2016 (Particle size distribution laser diffractometric analysis).

Among them, the physical definitions of $D_n10$, $D_v50$, and $D_v99$ are as follows:

$D_n10$ refers to the corresponding particle size when the cumulative number distribution percentage of the negative active material reaches 10%;

$D_v50$ refers to the corresponding particle size when the cumulative volume distribution percentage of the negative active material reaches 50%;

$D_v99$ refers to the corresponding particle size when the cumulative volume distribution percentage of the negative active material reaches 99%.

In the present application, the true density of the negative electrode active material has the meanings known in the art, and can be measured with instruments and methods known in the art, for example, a gas volume method. In accordance with GB/T 24586-2009 standard, it may be performed using AccuPyc II 1340 true density meter. An exemplary test method is as follows: a certain mass of negative active material is placed in a sample cup at 25° C., and the mass m of the negative active material is recorded. After that, the sample cup containing the negative electrode active material is put into the test chamber of the true density meter, which is closed, and passed with inert gas with small molecular diameter such as helium or nitrogen. And then the pressure of the gas in the sample chamber and the expansion chamber is detected. According to Bohr's law PV=nRT, the true volume V of the tested material is measured, and the true density ρ of the negative electrode active material of the present application is calculated by m/V in which n is the molar mass of gas in the sample cup; R is the ideal gas constant, which is 8.314; and T is the ambient temperature, which is 298.15K.

In the present application, the compaction density of the negative active material has the meanings known in the art, and can be measured with instruments and methods known in the art. For example, in accordance with GB/T24533-2009 standard, it can be measured by an electronic pressure tester, such as UTM7305 electronic pressure tester as an example. Accurately weigh about 1 g of the sample, add it to a mold with a bottom area of 1.327 cm², apply a pressure of 5 tons (corresponding to 49 KN) and keep it under this pressure for 30 seconds, and then release the pressure and keep it for 10 seconds, and then measure and obtain the compaction density of the negative active material.

The present application also provides a process for preparing a negative active material, which comprises the following steps:

S10, crushing bulk materials containing one or more of silicon-based materials and tin-based materials and obtaining a core structure with a certain particle size distribution;

S20, adding a polymer to a solvent and dispersing it homogeneously to obtain a solution;

S30, adding the core structure to the solution and mixing them homogeneously to obtain a mixture slurry;

S40, spray drying the mixture slurry under an inert non-oxidizing gas atmosphere to obtain a solid powder; and S50, subjecting the solid powder to a heat treatment at a particular temperature for a particular period under an inert non-oxidizing gas atmosphere to obtain the negative active material, in the presence or absence of a catalyst.

Compared with the traditional wet coating, the negative active material prepared by the spray drying method has more uniform coating, less agglomeration and higher preparation efficiency.

It should be noted that S10 is not an essential step, and the core material with the required particle size can also be commercially available.

In the above preparation method, the silicon-based materials in step S10 may be the aforementioned silicon-based materials, for example $SiO_x$, 0<x<2 and tin-based materials in step S10 may be the aforementioned tin-based materials.

In the above preparation method, the polymer in step S20 can be the aforementioned polymer.

In step S20, optionally, the solvent can be selected from one or more of N-methyl pyrrolidone (abbreviated as NMP), and N,N-Dimethylformamide (abbreviated as DMF).

In step S20, optionally, the ratio of the polymer mass to the solvent volume is 0.1 g/L to 15 g/L. Further optionally, the ratio of the polymer mass to the solvent volume is 0.5 g/L-10 g/L. For example, the ratio of the polymer mass to the solvent volume is 1 g/L~10 g/L, 1 g/L~5.2 g/L, 1.7 g/L~4.8 g/L, 1.7 g/L~4 g/L, 1.7 g/L~3.5 g/L, 2 g/L~3.5 g/L, or 2 g/L~2.5 g/L.

In step S30, optionally, the ratio of the core structure mass to the polymer mass is 10 to 180. Further optionally, the ratio of the core structure mass to the polymer mass is 16-100. For example, the ratio of the core structure mass to the polymer mass is 16-60, 20-58, 25-58, 30-55, or 40-50. If the addition amount of polymer is too high, the obtained negative active material will have a decreased transmittance of the infrared absorption peak at the wavelength of $1450\ cm^{-1}\sim1690\ cm^{-1}$, and the negative electrode active material will also have too high coating amount, and would be likely to agglomerate during the preparation process, which will affect the conduction of active ions during charge and discharge cycles, thereby causing the cycle performance of batteries to deteriorate. If the addition amount of polymer is too small, the obtained negative active material will have an increased transmittance of the infrared absorption peak at the wavelength of $1450\ cm^{-1}\sim1690\ cm^{-1}$, and the polymer will be difficult to uniformly coat and isolate the electrolyte erosion.

In step S40, optionally, the inert non-oxidizing gas is selected from one or more of nitrogen, argon, and helium.

In step S40, optionally, the spray drying is carried out at a temperature of 80° C. to 300° C. For example, the spray drying is carried out at temperature of 110° C. to 250° C. Herein, the heating rate can be 1° C./min~10° C./min. For example, the heating rate can be 1° C./min 5° C./min.

In step S50, optionally, the inert non-oxidizing gas atmosphere may be selected from one or more of nitrogen, argon, and helium.

In step S50, when a catalyst is used, optionally, the catalyst may be selected from one or more of sulfur, silver, ammoxidation catalyst and oxychlorine catalyst.

In step S50, the temperature of the heat treatment may be 250° C. to 450° C. Optionally, the temperature of the heat treatment is 300° C. to 450° C. If the heat treatment temperature is too high, the polymer coating layer tends to be completely carbonized, so the transmittance of the infrared absorption peak at the wavelength of $1450\ cm^{-1}\sim1690\ cm^1$ of the negative electrode active material cannot be controlled within the given range, and the elasticity and toughness of the polymer coating layer will deteriorate, and the polymer coating layer cannot adapt well to the expansion and contraction of the core structure during charging and discharging, and cannot ensure to isolate the surface of the core structure from the electrolyte, which makes the cycle performance of batteries deteriorate.

In step S50, the heat treatment is carried out for 2 h-8 h. Optionally, the heat treatment time is 3 h-5 h.

Secondary Battery

The second aspect of the present application provides a secondary battery comprising the negative active material according to the first aspect of the present application.

Specifically, the secondary battery comprises a positive electrode plate, a negative electrode plate, a separator, and an electrolyte. The negative electrode comprises a negative current collector and a negative electrode film disposed on at least one surface of the negative current collector, wherein the negative electrode film comprises the negative active material according to the first aspect of the present application.

In the secondary battery of the present application, the negative electrode current collector can be made of a material with good conductivity and mechanical strength, for example copper foil.

In the secondary battery of the present application, furthermore, the negative electrode film may optionally comprise other negative active materials useful for the secondary batteries. Other negative active materials are for example carbon materials. Optionally, the carbon materials is selected from one or more of graphite, soft carbon, hard carbon, mesophase carbon microspheres, carbon fibers and carbon nanotubes. For example, the carbon material is selected from graphite. The graphite can be selected from one or more of artificial graphite and natural graphite.

In the secondary battery of the present application, furthermore, the negative electrode film may optionally comprise a conductive agent, a binder, and a thickener, and there is no specific limitation on their types, and those skilled in the art can make selections according to actual needs.

As an example, the conductive agent used for the negative electrode film can be one or more of graphite, superconducting carbon, acetylene black, carbon black, Ketjen black, carbon dots, carbon nanotubes, graphene, and carbon nanofibers. The binder can be one or more of polyacrylic acid (PAA), sodium polyacrylate (PAAS), polyvinyl alcohol (PVA), styrene butadiene rubber (SBR), carboxymethyl cellulose (CMC), sodium alginate (SA), polymethacrylic acid (PMAA) and carboxymethyl chitosan (CMCS). The thickener can be sodium carboxymethyl cellulose (CMC).

The negative electrode plate can be prepared according to conventional methods in the art. For example, the negative active material and optional conductive agent, binder and thickener are dispersed in a solvent which can be deionized water to form a uniform negative electrode slurry. The negative electrode slurry is coated on the negative electrode current collector. After being dried, cold pressed and other processes, a negative electrode plate is obtained.

In the secondary battery of the present application, the positive electrode plate comprises a positive electrode current collector and a positive electrode film disposed on at least one surface of the positive electrode current collector and comprising a positive active material.

In the secondary battery of the present application, the positive electrode current collector can be made of materials with good electrical conductivity and mechanical strength, for example aluminum foil.

In the secondary battery of the present application, the type of the positive active material is not specifically limited, and materials useful for the secondary battery and known in the art can be used, and those skilled in the art can make selections according to actual needs.

It should be noted that the secondary battery of the present application may be a lithium ion battery, a sodium ion battery or any other battery using the negative active material described according to the first aspect of the present application.

When the secondary battery of the present application is a lithium ion battery, optionally, the positive active material may be selected from lithium transition metal oxides and modified materials thereof, and the modified material may be lithium transition metal oxide subjected to doping modification and/or coating modification. Optionally, the lithium transition metal oxide can be selected from one or more of lithium cobalt oxide, lithium nickel oxide, lithium manganese oxide, lithium nickel manganese oxide, lithium nickel cobalt manganese oxide, lithium nickel cobalt manganese oxide and lithium containing phosphate with olivine structure.

For example, the positive active material of the lithium ion battery can be selected from one or more of $LiCoO_2$, $LiNiO_2$, $LiMnO_2$, $LiMn_2O_4$, $LiNi_{1/3}Co_{1/3}Mn_{1/3}O_2$(NCM-333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$(LFP) and $LiMnPO_4$.

When the secondary battery of the present application is a sodium ion battery, optionally, the positive active material can be selected from transition metal oxide $Na_xMO_2$ (M is a transition metal, preferably from one or more of Mn, Fe, Ni, Co, V, Cu, and Cr, $0<x\leq1$), polyanionic materials (such as phosphate, fluorophosphate, pyrophosphate, sulfate), Prussian blue materials, and the like. However, the present application is not limited to these materials, other materials that can be used as a positive active material for sodium ion batteries can also be used. These positive electrode active materials may be used alone or in combination of two or more.

Optionally, the positive active material of the sodium ion battery can be selected from one or more of $NaFeO_2$, $NaCoO_2$, $NaCrO_2$, $NaMnO_2$, $NaNiO_2$, $NaNi_{1/2}Ti_{1/2}O_2$, $NaNi_{1/2}Mn_{1/2}O_2$, $Na_{2/3}Fe_{1/3}Mn_{2/3}O_2$, $NaNi_{1/3}CO_{1/3}Mn_{1/3}O_2$, $NaFePO_4$, $NaMnPO_4$, $NaCoPO_4$, Prussian blue materials, and materials with the general formula $A_aM_b(PO_4)_cO_xY_{3-x}$ where A is selected from one or more of $H^+$, $Li^+$, $Na^+$, $K^+$ and $NH_4^+$, and M is a transition metal cation, preferably one or more of V, Ti, Mn, Fe, Co, Ni, Cu and Zn, Y is a halogen anion, preferably one or more of F, Cl and Br, $0<a\leq4$, $0<b\leq2$, $1\leq c\leq3$, $0\leq x\leq2$.

In the secondary battery of the present application, furthermore, the positive electrode film may also comprise a binder and/or a conductive agent. The types of the binder and the conductive agent are not specifically limited, and those skilled in the art can make selections according to actual needs. As an example, the binder used for the positive electrode film may comprise one or more of polyvinylidene fluoride (PVDF) and polytetrafluoroethylene (PTFE); the conductive agent may comprise one or more of graphite, superconducting carbon, acetylene black, carbon black, Ketjen black, carbon dots, carbon nanotubes, graphene, and carbon nanofibers.

The above-mentioned positive electrode plate can be prepared according to conventional methods in the art. For example, the positive active material and optionally conductive agent and binder are dispersed in a solvent (such as N-methylpyrrolidone, abbreviated as NMP), to form a uniform positive electrode slurry, and the positive electrode slurry is coated on the positive electrode collector. After being dried, cold pressed and other processes, the positive electrode plate is obtained.

In the secondary battery of the present application, there is no specific limitation on the type of electrolyte, and it can be selected according to requirements. The electrolyte may be selected from at least one of solid electrolyte and liquid electrolyte (i.e. an electrolytic solution). When the electrolyte is an electrolytic solution, the electrolytic solution comprises an electrolyte salt and a solvent. Herein, there is no particular limitation to the specific types of electrolyte salt and solvent, which can be selected according to actual needs.

When the secondary battery of the present application is a lithium ion battery, optionally, the electrolyte salt may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorooxalatophosphate) and LiTFOP (lithium tetrafluorooxalate phosphate).

When the secondary battery of the present application is a sodium ion battery, optionally, the electrolyte salt may be selected from one or more of $NaPF_6$, $NaClO_4$, $NaBCl_4$, $NaSO_3CF_3$ and $Na(CH_3)C_6H_4SO_3$.

In the secondary battery of the present application, optionally, the solvent may be one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethylsulfone (MSM), methylethylsulfone (EMS), and diethylsulfone (ESE).

The electrolytic solution may optionally comprise an additive. The additive is not particularly limited and can be selected according to requirements. For example, the additives may comprise one or more of negative electrode film-forming additives, positive electrode film-forming additives, and additives that can improve certain performance of the battery, such as additives that improve overcharge performance of the battery, additives that improve high-temperature performance of the battery, and those that improve low-temperature performance of the battery.

In the secondary battery of the present application, the separator serves to isolate the positive electrode plate and the negative electrode plate. The separator is not particularly limited, and any well-known porous structure separator having chemical stability and mechanical stability can be selected, such as one or more of glass fiber, non-woven fabric, polyethylene, polypropylene and polyvinylidene fluoride. The separator can be a single-layer film or a multilayer composite film. When the separator is a multi-layer composite film, the materials of each layer may be the same or different.

The secondary battery can be prepared by a method known in the art. As an example, a positive electrode plate, a separator, and a negative electrode plate are wound (or stacked) in order, so that the separator is located between the positive electrode plate and the negative electrode plate to act as isolation, thereby obtaining an electrode component. The electrode component is placed in a packaging case, and then an electrolyte is injected therein and sealed to obtain a secondary battery.

Figure 4:
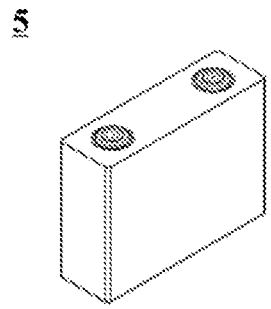
FIG. 4 is a perspective view of a secondary battery according to an embodiment of the present application.

The present application has no particular limitation on the shape of the secondary battery, which may be cylindrical, square or any other shapes. FIG. 4 shows a secondary battery 5 with a square structure as an example.

In some embodiments, the secondary battery may comprise an outer package. The outer packaging is used to package the positive electrode plate, the negative electrode plate and the electrolyte.

Figure 5:
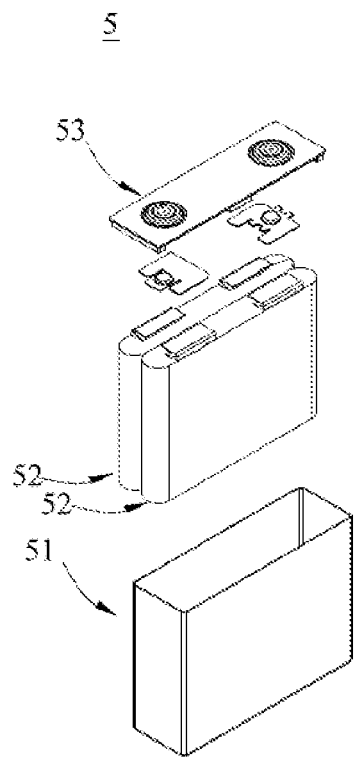
FIG. 5 is an exploded view of FIG. 4.

In some embodiments, referring to FIG. 5, the outer package may comprise a housing 51 and a cover 53, wherein the housing 51 may comprise a bottom plate and a side plate connected to the bottom plate, and the bottom plate and the side plate enclose a receiving cavity. The housing 51 has an opening communicating with the receiving cavity, and the cover plate 53 can cover the opening to close the receiving cavity.

A positive electrode plate, a negative electrode plate and a separator may be formed into an electrode assembly 52 through a winding process or a lamination process. The electrode assembly 52 is packaged in the receiving cavity. The electrolyte which can be an electrolytic solution is infiltrated in the electrode assembly 52. The number of electrode assemblies 52 contained in the secondary battery 5 can be one or more, which can be adjusted according to requirements.

In some embodiments, the outer packaging of the secondary battery may be a hard case, such as a hard plastic case, an aluminum case, a steel case. The outer packaging of the secondary battery may also be a soft bag, such as a pouch type soft bag. The material of the soft bag can be plastic, for example, it can comprise one or more of polypropylene (PP), polybutylene terephthalate (PBT), polybutylene succinate (PBS).

In some embodiments, the secondary battery can be assembled to form a battery module. The number of secondary batteries contained in the battery module can be multiple, and the specific number can be adjusted according to the application and capacity of the battery module.

Figure 6:
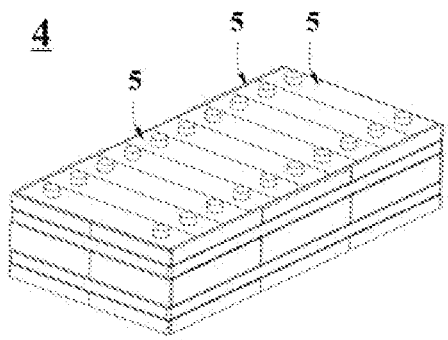
FIG. 6 is a perspective view of a battery module according to an embodiment of the present application.

FIG. 6 is a battery module 4 as an example. Referring to FIG. 6, in the battery module 4, a plurality of secondary batteries 5 may be arranged in sequence along the length direction of the battery module 4. Of course, it can also be arranged in any other manner. Further, the plurality of secondary batteries 5 can be fixed by fasteners.

Optionally, the battery module 4 may further comprise a housing with a receiving space, and a plurality of secondary batteries 5 are accommodated in the receiving space.

In some embodiments, the above-mentioned battery module can further be assembled into a battery pack. The number of battery modules contained in the battery pack can be adjusted according to the application and capacity of the battery pack.

Figure 7:
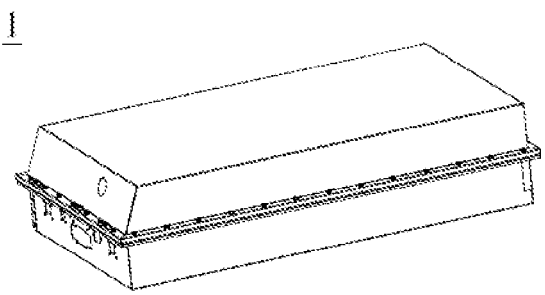
FIG. 7 is a perspective view of a battery pack according to an embodiment of the present application.
Figure 8:
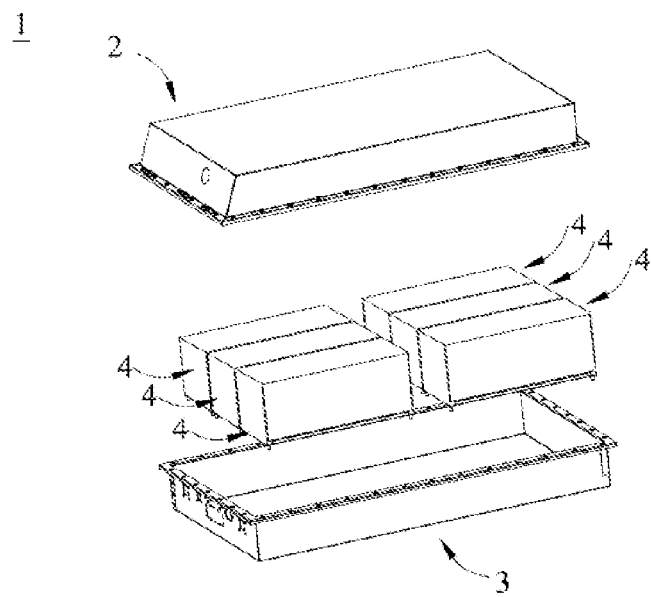
FIG. 8 is an exploded view of FIG. 7.

FIGS. 7 and 8 are the battery pack 1 as an example. Referring to FIGS. 7 and 8, the battery pack 1 may comprise a battery case and a plurality of battery modules 4 provided in the battery case. The battery case includes an upper case 2 and a lower case 3. The upper case 2 can be covered on the lower case 3 and forms a closed space for accommodating the battery module 4. Multiple battery modules 4 can be arranged in the battery box in any manner.

Device

The present application further provides a device comprising at least one of the secondary battery, battery module, or battery pack of the present application. The secondary battery, battery module or battery pack can be used as a power source of the device, and can also be used as an energy storage unit of the device. The device can be, but is not limited to, mobile devices (such as mobile phones, notebook computers), electric vehicles (such as pure electric vehicles, hybrid electric vehicles, plug-in hybrid electric vehicles, electric bicycles, electric scooters, electric golf carts, electric trucks.), electric trains, ships and satellites, energy storage systems, etc.

The device can be selected as a secondary battery, a battery module, or a battery pack according to its usage requirements.

Figure 9:
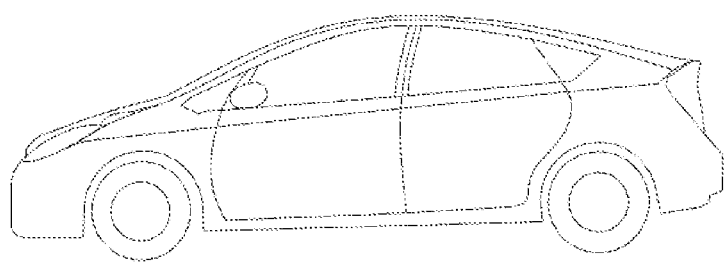
FIG. 9 is a schematic view showing a device with a secondary battery as a power source according to an embodiment of the present application.

FIG. 9 is a device as an example. The device is a pure electric vehicle, a hybrid electric vehicle, or a plug-in hybrid electric vehicle. In order to meet the requirements of the device for high power and high energy density of the secondary battery, a battery pack or a battery module can be used.

As another example, the device may be a mobile phone, a tablet computer, a notebook computer, etc. The device is generally required to be thin and light, and a secondary battery can be used as a power source.

EXAMPLES

The following examples are intended to describe the disclosure of the present application in more detail for only illustrative purpose, and various modifications and changes in the scope of the present disclosure will be apparent to those skilled in the art. All parts, percentages, and ratios reported in the following examples are by weight unless otherwise stated, and all reagents used in the examples are commercially available or synthetically obtained by conventional methods and are directly used without further processing, and the instruments used in the examples are commercially available.

Example 1

Preparation of Negative Active Material

Silicon monooxide (SiO) bulk was crushed to obtain a core structure with a certain particle size distribution.

1 g of polyacrylonitrile (PAN) was dispersed into 1000 mL of dimethylformamide (DMF) as a solvent with stirring, until the polyacrylonitrile was completely dissolved to obtain a solution.

100 g of the core structure was added to the solution and mixed homogeneously to obtain a mixture slurry.

The mixture slurry was transferred to a spray dryer in an argon atmosphere at 190° C. for spray drying, thereby obtaining a solid powder.

The solid powder was heat-treated in an argon atmosphere at 450° C. for 4 h, and then cooled to obtain the negative active material.

Preparation of Button Cell

The resulting mixture negative active material obtained by mixing the above prepared negative active material with artificial graphite in a mass ratio of 3:7, conductive carbon black (Super-P), a thickener sodium carboxymethyl cellulose (CMC) and a binder Styrene butadiene rubber were mixed at a mass ratio of 88:3.3:6 in an appropriate amount of deionized water, which was stirred homogeneously with a vacuum stirrer to obtain a slurry; the slurry was coated on the surface of the negative electrode current collector copper foil and was dried completely in a vacuum drier. After that, it was roller pressed and cut to obtain small disc-shaped electrode plate with a certain area, which can be used as a negative electrode plate of a secondary battery.

A lithium metal plate was used as an electrode, Celgard 2400 separator was used, and electrolyte was injected to assemble a button cell. The electrolyte was prepared by mixing ethylene carbonate (EC), dimethyl carbonate (DMC), and diethyl carbonate (DEC) in a volume ratio of 1:1:1 homogeneously to obtain an organic solvent, and then dissolving LiPF6 in the above organic solvent and adding an additive fluoroethylene carbonate (FEC), where the concentration of LiPF6 was 1 mol/L, and the mass percentage of FEC in the electrolyte was 6%.

Examples 2 to 17 and Comparative Examples 1 to 4

Examples 2 to 17 and Comparative Examples 1 to 4 were the same as Example 1 with the exception that the relevant parameters in the preparation steps of the negative active material were adjusted to obtain different negative active materials. The preparation parameters that were different from those in Example 1 were shown in Table 1.

Measurement

1. The negative active material was tested using the test method described above.
2. Test for first Coulombic efficiency and cycle performance of button cell Under a normal pressure environment at 25° C., a button battery was discharged at a constant current rate of 0.1 C to 0.005V, and then discharged at a constant current of 0.05 C to 0.005V. The resulting discharge capacity was recorded as the lithiation capacity for the first cycle. After that, the battery was charged to 1.5V at a constant current rate of 0.1 C. The resulting charge capacity was recorded as the delithiation capacity for the first cycle. The button battery was subjected to 50 cycles of charge-discharge cycle following the procedure described above, and the delithiation capacity for each cycle was recorded.

First Coulombic efficiency of button cell (%)=delithiation capacity for the $1^{st}$ cycle/the lithiation capacity for the $1^{st}$ cycle×100%

Cycle capacity retention rate of button cell (%)=delithiation capacity for the $50^{th}$ cycle/the lithiation capacity for the $1^{st}$ cycle×100%

Measurement results of Examples 1-17 and Comparative Examples 1-4 were shown in Table 2.

TABLE 1

| | Core material | | Polymer | | Heat-treatment | |
|---|---|---|---|---|---|---|
| No. | Type | Mass (g) | Type | Mass (g) | Temperature (° C.) | Time (h) |
| Ex 1 | Silicon monoxide | 100 | polyacrylonitrile | 1 | 450 | 4 |
| Ex 2 | Silicon monooxide | 100 | Polyacrylonitrile | 1.7 | 450 | 4 |
| Ex 3 | Silicon monooxide | 100 | Polyacrylonitrile | 2 | 450 | 4 |
| Ex 4 | Silicon monooxide | 100 | Polyacrylonitrile | 2.5 | 450 | 4 |
| Ex 5 | Silicon monooxide | 100 | Polyacrylonitrile | 3.5 | 450 | 4 |
| Ex 6 | Silicon monooxide | 100 | Polyacrylonitrile | 4 | 450 | 4 |
| Ex 7 | Silicon monooxide | 100 | Polyacrylonitrile | 4.8 | 450 | 4 |

TABLE 1-continued

| | Core material | | Polymer | | Heat-treatment | |
|---|---|---|---|---|---|---|
| No. | Type | Mass (g) | Type | Mass (g) | Temperature (° C.) | Time (h) |
| Ex 8 | Silicon monooxide | 100 | Polyacrylonitrile | 5.2 | 450 | 4 |
| Ex 9 | Silicon monooxide | 100 | Polyacrylonitrile | 2 | 300 | 4 |
| Ex 10 | Silicon monooxide | 100 | Polyacrylonitrile | 2 | 350 | 4 |
| Ex 11 | Silicon monooxide | 100 | Polyacrylonitrile | 2 | 400 | 4 |
| Ex 12 | Silicon monooxide | 100 | Polyacrylonitrile | 2 | 450 | 4 |
| Ex 13 | Silicon monooxide | 100 | Polyacrylonitrile | 2 | 450 | 4 |
| Ex 14 | Silicon monooxide | 100 | Polyacrylonitrile | 2 | 450 | 4 |
| Ex 15 | Silicon monooxide | 100 | Polyacrylonitrile | 2 | 450 | 4 |
| Ex 16 | Silicon monooxide | 100 | Polyacrylonitrile | 2 | 450 | 4 |
| Ex 17 | Silicon monooxide | 100 | Polyacrylonitrile | 2 | 450 | 4 |
| CEx 1 | Silicon monooxide | 100 | Polyacrylonitrile | 4 | / | / |
| CEx 2 | Silicon monooxide | 100 | Polyacrylonitrile | 4 | 1200 | 4 |
| CEx 3 | Silicon monooxide | 100 | Polyacrylonitrile | 0.5 | 450 | 4 |
| CEx 4 | Silicon monooxide | 100 | Polyacrylonitrile | 7 | 450 | 4 |

TABLE 2

| | Negative active material | | | | | | Button cell | |
|---|---|---|---|---|---|---|---|---|
| No. | $D_n10$ (μm) | $D_v50$ (μm) | $D_v99$ (μm) | IR absorption peak | IR absorption peak Transmittance T (%) | $I_D/I_G$ | First Coulombic efficiency (%) | Cycle capacity retention rate after 50 cycles (%) |
| Ex 1 | 1.6 | 6.7 | 20.1 | Yes | 99.0 | 1.87 | 79.07 | 93.60 |
| Ex 2 | 1.7 | 6.8 | 20.0 | Yes | 98.5 | 1.89 | 81.77 | 97.34 |
| Ex 3 | 1.6 | 6.9 | 20.3 | Yes | 93.6 | 1.90 | 82.96 | 98.40 |
| Ex 4 | 1.7 | 6.8 | 20.2 | Yes | 91.7 | 1.86 | 82.52 | 98.24 |
| Ex 5 | 1.7 | 6.9 | 20.5 | Yes | 89.5 | 1.92 | 81.49 | 96.20 |
| Ex 6 | 1.8 | 6.8 | 20.6 | Yes | 87.2 | 1.91 | 80.46 | 95.98 |
| Ex 7 | 1.7 | 6.9 | 20.8 | Yes | 85.1 | 1.90 | 79.43 | 95.87 |
| Ex 8 | 1.8 | 6.9 | 20.9 | Yes | 80.3 | 1.95 | 77.93 | 92.98 |
| Ex 9 | 1.6 | 6.8 | 20.3 | Yes | 98.8 | 2.48 | 81.00 | 96.34 |
| Ex 10 | 1.7 | 6.9 | 20.4 | Yes | 97.1 | 2.29 | 81.43 | 96.97 |
| Ex 11 | 1.6 | 6.9 | 20.3 | Yes | 95.4 | 2.17 | 82.44 | 97.42 |
| Ex 12 | 1.6 | 6.8 | 20.3 | Yes | 94.1 | 1.63 | 82.91 | 98.35 |
| Ex 13 | 0.56 | 6.2 | 15.4 | Yes | 93.2 | 1.93 | 81.46 | 97.24 |
| Ex 14 | 1.13 | 6.4 | 18.7 | Yes | 93.4 | 1.95 | 81.77 | 97.61 |
| Ex 15 | 2.34 | 7.1 | 20.1 | Yes | 93.5 | 1.89 | 83.11 | 98.47 |
| Ex 16 | 2.97 | 7.0 | 20.3 | Yes | 93.4 | 1.90 | 83.40 | 98.96 |
| Ex 17 | 3.72 | 7.5 | 21.6 | Yes | 93.6 | 1.88 | 82.64 | 98.13 |
| CEx 1 | 1.8 | 6.8 | 20.6 | No | 100.0 | / | 74.7 | 90.10 |
| CEx 2 | 1.7 | 6.8 | 20.5 | No | 100.0 | 1.32 | 76.4 | 90.30 |
| CEx 3 | 1.6 | 6.7 | 20.3 | Yes | 99.8 | 1.89 | 75.44 | 92.70 |
| CEx 4 | 1.8 | 6.9 | 21.0 | Yes | 72.1 | 1.92 | 70.96 | 84.40 |

In Table 2, "/" means that the material does not contain the scattering peak.

It was shown from the data in Table 2 that the button cell as prepared by Examples 1-17 had improved first Coulombic efficiency and cycle performance.

In Comparative Example 1, the negative active material had a polymer coating layer but the polymer coating layer was not subjected to heat treatment and thus there was no —C═C— bond in the coating layer. Since the insulating properties of the polymer itself could affect conductivity of lithium ions during charge and discharge cycles, the first Coulombic efficiency of the button cell was low and the cycle performance was poor.

In Comparative Example 2, the polymer was heat-treated at an elevated temperature of 1200° C., the polymer was almost completely carbonized, and the coating layer was almost an inorganic carbon layer and there was no —C═C— bond in the coating layer of the negative electrode active material characterized in that when the negative electrode active material was subjected to an infrared spectrum analysis, the transmittance of the infrared absorption peak at the wavelength of 1450 cm$^{-1}$~1690 cm$^{-1}$ was 100%, rendering elasticity and toughness of the coating layer poor, and the coating layer could not adapt to the expansion and contraction of silicon oxide compound during charge and discharge cycles, which resulted in the SEI film on the surface of the negative electrode active material to continue to be broken and repaired. As a result, on the one hand, a large amount of lithium ions were consumed and on the other hand, the exposed negative electrode active material would directly contact the electrolyte, and side reactions on the surface of the negative electrode active material would also increase, so the cycle performance of the button cell deteriorated.

In the infrared spectrum of the negative electrode active material prepared in Comparative Example 3, the transmittance of the infrared absorption peak at the wavelength of 1450 cm$^{-1}$~1690 cm$^{-1}$ was extremely large, indicating that the coating amount of the negative electrode active material was small and the coating layer was difficult to uniformly cover the core structure and to isolate from electrolyte erosion, thereby obtaining poor first Coulombic efficiency of the button cell. Moreover, the polymer coating layer had poor elasticity and toughness, and could not adapt to the expansion and contraction of silicon oxide compound during charge and discharge cycles, which resulted in the SEI film on the surface of the negative electrode active material to continue to be broken and repaired. As a result, on the one hand, a large amount of lithium ions were consumed and on the other hand, the exposed negative electrode active material would directly contact the electrolyte, and side reactions on the surface of the negative electrode active material would also increase, so the cycle performance of the button cell deteriorated.

In the infrared spectrum of the negative electrode active material prepared in Comparative Example 4, the transmittance of the infrared absorption peak at the wavelength of 1450 $cm^{-1}$~1690 $cm^{-1}$ was very low, indicating that the coating amount of the negative electrode active material was large and the first Coulombic efficiency of the button cell is low. Moreover, the negative electrode active material was also prone to agglomeration, causing the situation that the surface of the negative electrode active material was not covered by the coating layer completely. During charge and discharge cycles of the button cell, the agglomerated negative active material particle would gradually disperse as the negative electrode active material particles expanded, thereby exposing a large amount of fresh uncoated surface, accelerating consumption of lithium ions, so the cycle performance of button batteries deteriorated.

The above mentioned descriptions only show particular implementations of the present application and but are not intended to limit the protection scope of the present application. Any modification or replacement readily figured out by a person skilled in the art within the technical scope disclosed in the present application shall fall within the protection scope of the present application. Therefore, the protection scope of the present application shall be determined by the protection scope of the claims.

The invention claimed is:

1. A negative active material comprising a core structure and a polymer coating layer coated on at least a part of the outer surface of the core structure, wherein the core structure comprises silicon-based materials;

wherein the negative active material has an infrared spectrum comprising an infrared absorption peak at the wavelength of 1450 $cm^{-1}$ to 1690 $cm^{-1}$, and the infrared absorption peak has a transmittance T that satisfies 85%≤T≤98.5%, as measured according to the description, wherein the coating layer comprises carbon element and comprises —C=C— linkage, and wherein the coating layer comprises nitrogen element and comprises —C=N— linkage.

2. The negative active material according to claim 1, wherein the carbon element in the coating layer is present in an amount of 0.5%~4.0% based on the total weight of the negative active material.

3. The negative active material according to claim 1, wherein the nitrogen element is present in an amount of 0.1%~0.66% based on the total weight of the negative active material.

4. The negative active material according to claim 1, wherein the negative active material has an X-ray diffraction pattern comprising a diffraction peak at the diffraction angle 2θ of 19° to 27° and the diffraction peak has a half peak width of 4° to 12°; and/or the negative active material has a Raman spectrum comprising scattering peaks at the Raman shifts of 1320 $cm^{-1}$~1410 $cm^{-1}$ and 1550 $cm^{-1}$-1650 $cm^{-1}$ in which the scattering peak at the Raman shifts of 1320 $cm^{-1}$~1410 $cm^{-1}$ has a peak intensity recorded as $I_D$, and the scattering peak at the Raman shifts of 1550 $cm^{-1}$~1650 $cm^{-1}$ has a peak intensity recorded as $I_G$, and the $I_D$ and the $I_G$ stratify 1.60≤$I_D$/$I_G$≤2.50.

5. The negative active material according to claim 1, wherein the negative active material satisfies one or more of the following:

(1) the negative active material has a number particle size distribution Dn10 of 0.1 μm~4 μm;

(2) the negative active material has a number particle size distribution $D_v$50 of 4 μm~15 μm;

(3) the negative active material has a number particle size distribution $D_v$99 of 8 μm~25 μm;

(4) the negative active material has a compaction density of 1.0 $g/cm^3$~1.6 $g/cm^3$ under the test condition of 5 tonnes (equivalent to 49 KN); and (5) the negative active material has a real density of 2.1 $g/cm^3$~2.5 $g/cm^3$.

6. The negative active material according to claim 1, wherein the silicon-based material is selected from one or more of elemental silicon, silicon-carbon composites, silicon-oxygen compounds, silicon-nitrogen compounds, and silicon alloys; and the tin-based material is selected from one or more of elemental tin, tin oxide compounds, and tin alloys.

7. A preparation process of a negative active material, comprising:

a) providing silicon-based materials as a core structure;

b) adding a polymer into a solvent and dispersing it homogenously to obtain a solution, wherein the polymer is selected from one or more of polyacrylonitrile and polyacrylamide;

c) adding the core structure to the solution, and mixing it homogeneously to obtain a mixture slurry;

d) spray drying the mixture slurry under an inert non-oxidizing gas atmosphere to obtain a solid powder;

e) subjecting the solid powder to a heat treatment under an inert non-oxidizing gas atmosphere to obtain the negative active material;

wherein the negative active material comprises a core structure and a polymer coating layer coated on at least a part of the outer surface of the core structure, the core structure comprises one or more of silicon-based materials and tin based materials; and the negative active material has an infrared spectrum comprising an infrared absorption peak at the wavelength of 1450 $cm^{-1}$ to 1690 $cm^{-1}$, and the infrared absorption peak has a transmittance T that satisfies 85%≤T≤98.5%, wherein the coating layer comprises carbon element and comprises —C=C— linkage, and wherein the coating layer comprises nitrogen element and comprises —C=N— linkage.

8. The preparation process according to claim 7, wherein in the step b), the ratio of the polymer mass and the solvent volume of is 0.1 g/L~15 g/L; and/or in the step c), the ratio of the core structure mass of and the polymer mass is 10~180; and/or in the step d), the spray drying is carried out at a temperature of 80° C.~300° C.; and/or in the step e), the heat treatment is carried out at a temperature of 250° C.~450° C.; the heat treatment is carried out for 2 h~8 h.

9. A secondary battery comprising the negative active material according to claim 1.

10. A device comprising the secondary battery according to claim 9.

11. The negative active material according to claim 1, wherein the carbon element in the coating layer is present in an amount of 0.74~1.3% based on the total weight of the negative active material.

12. The negative active material according to claim 1, wherein the nitrogen element is present in an amount of 0.2%~0.56% based on the total weight of the negative active material.

13. The negative active material according to claim 1, wherein the negative active material has an X-ray diffraction pattern comprising a diffraction peak at the diffraction angle 2 θ of 19° to 27° and the diffraction peak has a half peak width of 5° to 10°; and/or the negative active material has a Raman spectrum comprising scattering peaks at the Raman shifts of 1320 cm$^{-1}$~1410 cm$^{-1}$ and 1550 cm$^{-1}$~1650 cm$^{-1}$ in which the scattering peak at the Raman shifts of 1320 cm$^{-1}$~1410 cm$^{-1}$ has a peak intensity recorded as $I_D$, and the scattering peak at the Raman shifts of 1550 cm$^{-1}$~1650 cm$^{-1}$ has a peak intensity recorded as $I_G$, and the $I_D$ and the $I_G$ stratify $1.80 \leq I_D/I_G \leq 2.40$.

14. The negative active material according to claim 1, wherein the negative active material satisfies one or more of the following:

(1) the negative active material has a number particle size distribution $D_n 10$ of 0.15 μm~3 μm;

(2) the negative active material has a number particle size distribution $D_v 50$ of 5 μm~10 μm;

(3) the negative active material has a number particle size distribution $D_v 99$ of 12 μm~22 μm;

(4) the negative active material has a compaction density of 1.2 g/cm$^3$~1.5 g/cm$^3$ under the test condition of 5 tonnes (equivalent to 49 KN); and (5) the negative active material has a real density of 2.2 g/cm$^3$~2.4 g/cm$^3$.

15. The negative active material according to claim 1, wherein the silicon-based material is selected from silicon-oxygen compounds.

16. The preparation process according to claim 7, wherein in the step b), the ratio of the polymer mass and the solvent volume of is 0.5 g/L~10 g/L; and/or in the step c), the ratio of the core structure mass of and the polymer mass is 16~100; and/or in the step d), the spray drying is carried out at a temperature of 110° C.~250° C.; and/or in the step e), the heat treatment is carried out at a temperature of 300° C.~450° C.; and the heat treatment is carried out for 3 h-5 h.

* * * * *